US012681740B2

(12) United States Patent　　(10) Patent No.: US 12,681,740 B2
Chai　　(45) Date of Patent: Jul. 14, 2026

(54) METHOD, SYSTEM, MEDIUM, AND SERVER FOR OPERATION MANAGEMENT OF ELECTRONIC DEVICES

(71) Applicant: Shanghai Dalong Technology Co., Ltd., Shanghai (CN)

(72) Inventor: Yilei Chai, Shanghai (CN)

(73) Assignee: Shanghai Dalong Technology Co., Ltd., Shanghai (CN)

( * ) Notice: Subject to any disclaimer, the term of this patent is extended or adjusted under 35 U.S.C. 154(b) by 1187 days.

(21) Appl. No.: 17/627,131

(22) PCT Filed: Aug. 22, 2019

(86) PCT No.: PCT/CN2019/101991
　　§ 371 (c)(1),
　　(2) Date: Aug. 26, 2022

(87) PCT Pub. No.: WO2021/007920
　　PCT Pub. Date: Jan. 21, 2021

(65) Prior Publication Data
　　US 2023/0018479 A1　　Jan. 19, 2023

(30) Foreign Application Priority Data
　　Jul. 18, 2019　(CN) .......................... 201910651072.5

(51) Int. Cl.
　　*G06Q 30/00*　　(2023.01)
　　*G06F 8/61*　　(2018.01)
　　(Continued)

(52) U.S. Cl.
　　CPC ............... *G06F 9/452* (2018.02); *G06F 8/61* (2013.01); *G06Q 30/0633* (2013.01); *G06Q 30/0645* (2013.01)

(58) Field of Classification Search
　　CPC ............... G06Q 30/00; G06Q 30/0601; G06Q 30/0623; G06Q 30/0625; G06Q 30/0633; G06Q 30/0641
　　See application file for complete search history.

(56) References Cited

U.S. PATENT DOCUMENTS 7,933,823 B1 *　4/2011　Seifert ................ H04L 12/1804
　　　　　　　　　　　　705/37
9,485,290 B1 *　11/2016　Kolomeitsev ......... H04L 67/125
　　　　　　　　　　　　(Continued)

OTHER PUBLICATIONS

Guo, Lei, et al. "Quick answer for big data in sharing economy: Innovative computer architecture design facilitating optimal service-demand matching." IEEE Transactions on Automation science and engineering 15.4 (2018): 1494-1506. (Year: 2018).*
　　　　　　　　　　　　(Continued)

*Primary Examiner* — Christopher B Seibert
(74) *Attorney, Agent, or Firm* — IPRTOP LLC

(57)　　ABSTRACT

The present disclosure provides a method and system for managing the operation of an electronic device, a medium, and a server. The method for managing the operation of an electronic device includes: receiving related information of idle electronic devices reported by a client by using a first application program (101*a*); storing the related information of each idle electronic device (102*a*); receiving a usage request for an idle electronic device sent by a user terminal (103*a*); and searching for a correspondingly matched idle electronic device according to the usage request, and sending related information of the correspondingly matched idle electronic device to the user terminal, so that the user terminal remotely controls a second desktop system of the correspondingly matched idle electronic device by using a second application program (104*a*). In this method, an electronic device in an idle state may be rented to others for use, realizing full utilization of the electronic device, avoid- (Continued)

ing a waste of idle resources, saving user costs, and reducing pollution.

10 Claims, 5 Drawing Sheets

(51) Int. Cl.
  *G06F 9/451* (2018.01)
  *G06Q 30/0601* (2023.01)
  *G06Q 30/0645* (2023.01)

(56) References Cited

U.S. PATENT DOCUMENTS

| | | | | |
|---|---|---|---|---|
| 10,191,772 | B2* | 1/2019 | Beveridge | G06F 9/5011 |
| 10,216,256 | B2* | 2/2019 | Sagar | G06F 9/485 |
| 2007/0038526 | A1* | 2/2007 | Painter | G06Q 50/188 |
| | | | | 705/26.61 |
| 2007/0073799 | A1* | 3/2007 | Adjali | H04L 67/306 |
| | | | | 709/200 |
| 2008/0010871 | A1* | 1/2008 | Holmes | G09F 27/00 |
| | | | | 40/448 |
| 2009/0099836 | A1* | 4/2009 | Jacobsen | G06F 40/58 |
| | | | | 704/E15.001 |
| 2011/0027181 | A1* | 2/2011 | Amodei | A61L 31/16 |
| | | | | 424/9.1 |
| 2011/0028945 | A1* | 2/2011 | Amodei | A61K 47/6901 |
| | | | | 604/890.1 |
| 2012/0113091 | A1* | 5/2012 | Isaacson | G06T 1/20 |
| | | | | 345/418 |
| 2013/0047123 | A1* | 2/2013 | May | G06F 3/04817 |
| | | | | 715/834 |
| 2013/0226687 | A1* | 8/2013 | Perry | G06Q 20/384 |
| | | | | 705/14.33 |
| 2014/0373020 | A1* | 12/2014 | Govindarajeswaran | |
| | | | | G06F 9/505 |
| | | | | 718/102 |
| 2015/0058191 | A1* | 2/2015 | Khan | G06Q 20/4016 |
| | | | | 705/35 |
| 2015/0089626 | A1* | 3/2015 | Korangy | H04L 63/02 |
| | | | | 709/226 |
| 2015/0163206 | A1* | 6/2015 | McCarthy | G06F 21/6227 |
| | | | | 726/4 |
| 2015/0213433 | A1* | 7/2015 | Khan | G06Q 20/3829 |
| | | | | 705/71 |
| 2015/0324791 | A1* | 11/2015 | Khan | H04W 12/086 |
| | | | | 705/44 |
| 2015/0350177 | A1* | 12/2015 | Sharp | G06Q 20/321 |
| | | | | 726/6 |
| 2015/0378782 | A1* | 12/2015 | Hks | G06F 9/4887 |
| | | | | 718/103 |
| 2016/0008632 | A1* | 1/2016 | Wetmore | A61N 1/36025 |
| | | | | 607/45 |
| 2016/0260279 | A1* | 9/2016 | Arnone | G07F 17/326 |
| 2016/0260286 | A1* | 9/2016 | Arnone | G07F 17/3204 |
| 2016/0344710 | A1* | 11/2016 | Khan | H04L 63/061 |
| 2016/0358172 | A1* | 12/2016 | Ziat | G06Q 20/227 |
| 2017/0329943 | A1* | 11/2017 | Choi | H04L 63/0428 |
| 2017/0357798 | A1* | 12/2017 | Khan | G06Q 20/4014 |
| 2017/0357936 | A1* | 12/2017 | Byington | G06Q 20/3278 |
| 2018/0353869 | A1* | 12/2018 | Corkin | A63H 5/00 |
| 2019/0096009 | A1* | 3/2019 | Xu | G07F 13/06 |
| 2021/0149746 | A1* | 5/2021 | Fan | G06F 9/5027 |
| 2023/0018479 | A1* | 1/2023 | Chai | G06Q 30/0645 |

OTHER PUBLICATIONS

Kenyon, Chris, and Stathis Tompaidis. "Real options in leasing: the effect of idle time." Operations Research 49.5 (2001): 675-689. (Year: 2001).*

* cited by examiner

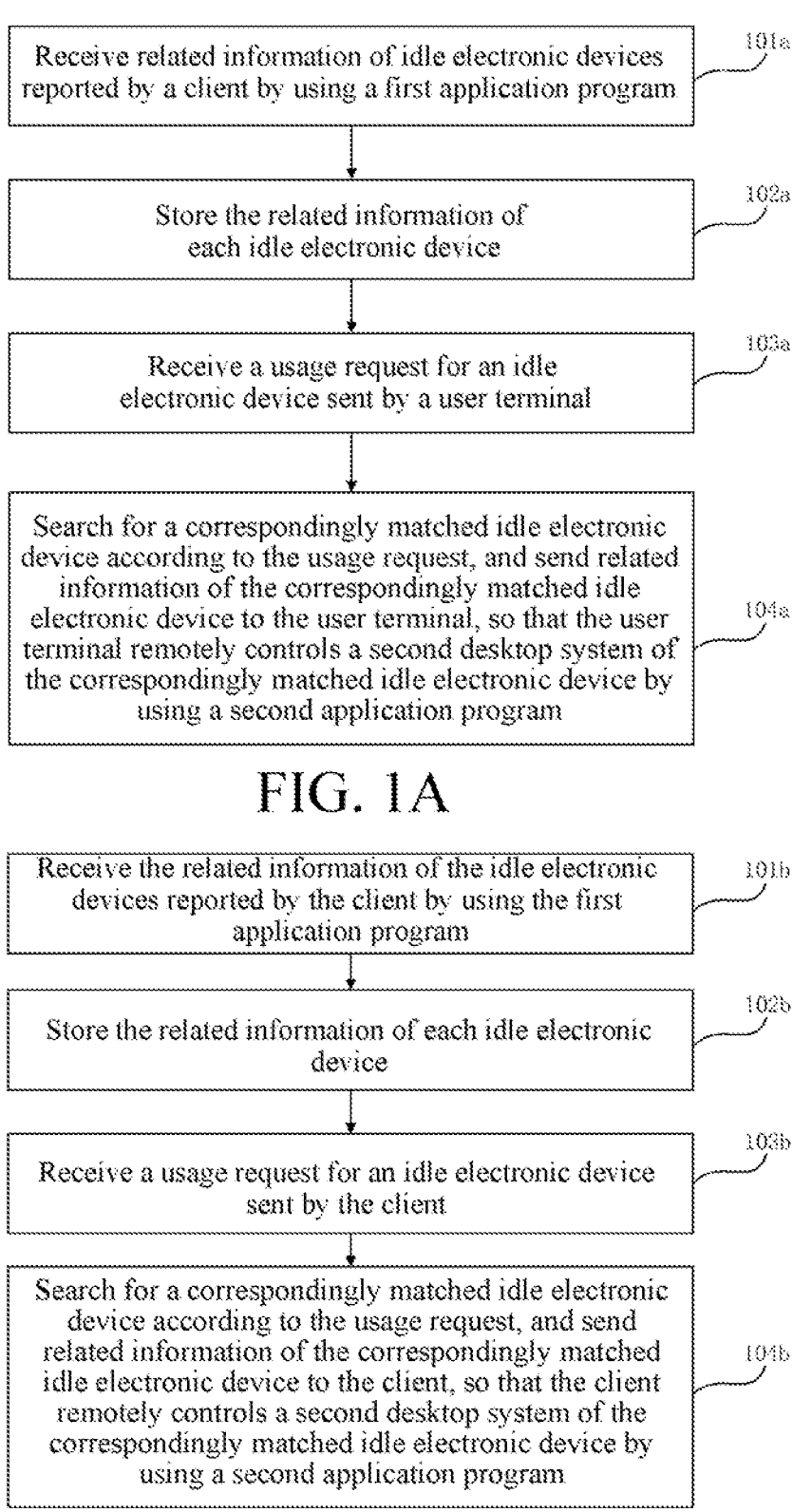

Receive related information of idle electronic devices reported by a client by using a first application program — 101a Store the related information of each idle electronic device — 102a Receive a usage request for an idle electronic device sent by a user terminal — 103a Search for a correspondingly matched idle electronic device according to the usage request, and send related information of the correspondingly matched idle electronic device to the user terminal, so that the user terminal remotely controls a second desktop system of the correspondingly matched idle electronic device by using a second application program — 104a

FIG. 1A

Receive the related information of the idle electronic devices reported by the client by using the first application program — 101b Store the related information of each idle electronic device — 102b Receive a usage request for an idle electronic device sent by the client — 103b Search for a correspondingly matched idle electronic device according to the usage request, and send related information of the correspondingly matched idle electronic device to the client, so that the client remotely controls a second desktop system of the correspondingly matched idle electronic device by using a second application program — 104b

FIG. 1B

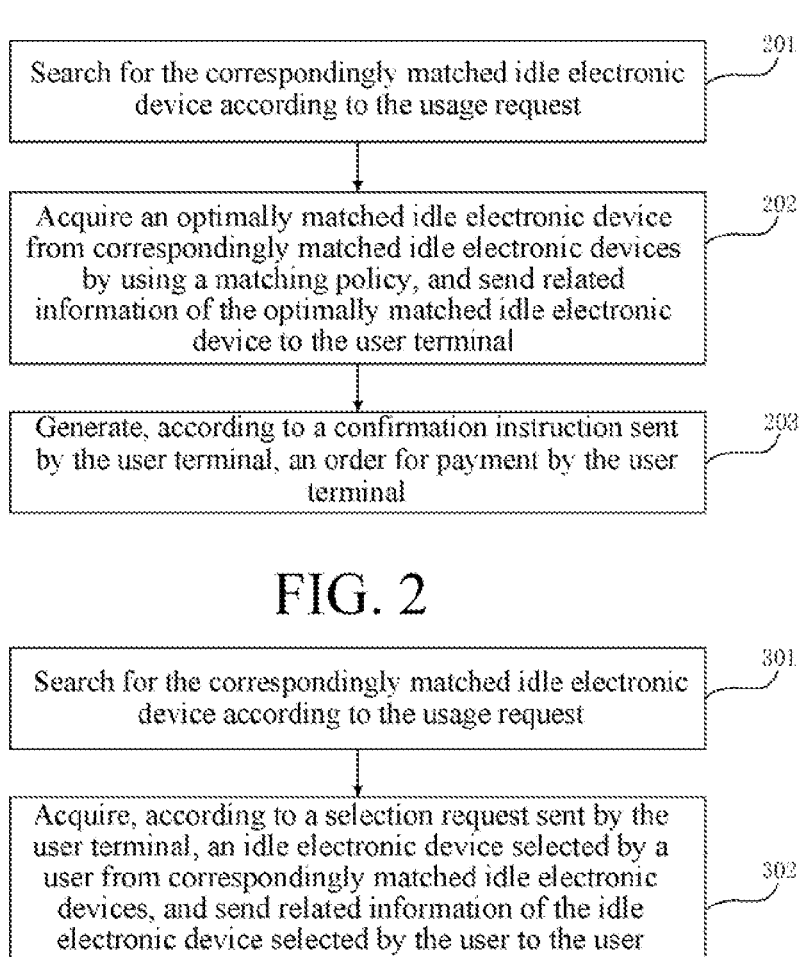
FIG. 2
FIG. 3
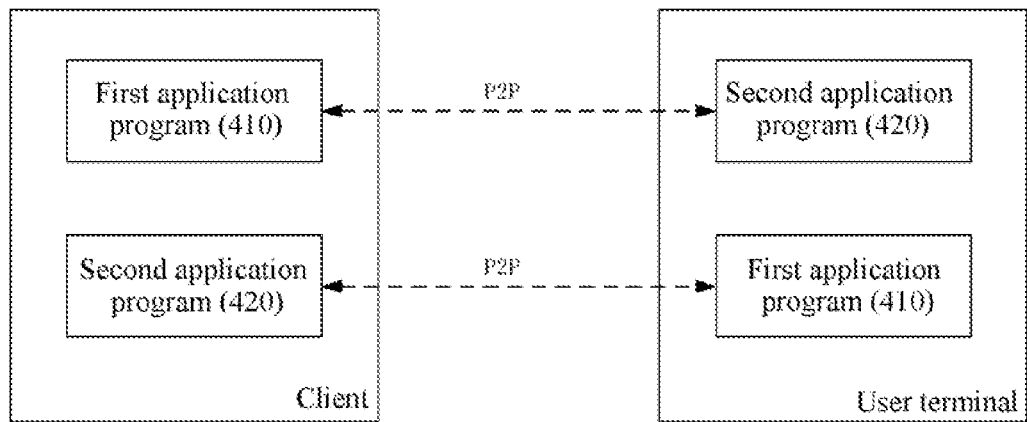
FIG. 4

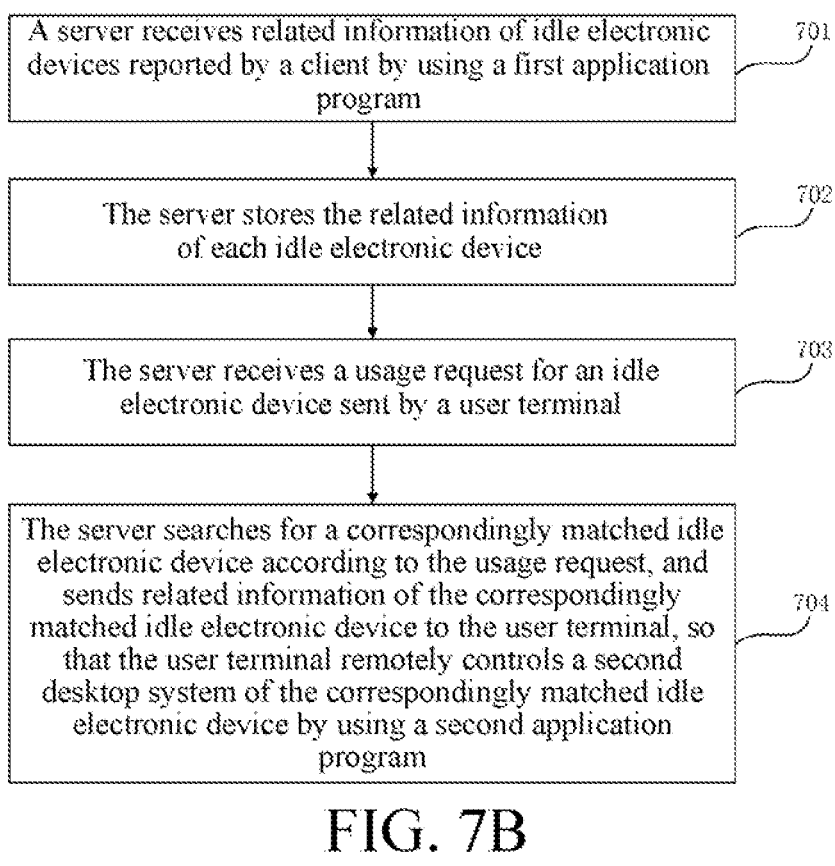

A server receives related information of idle electronic devices reported by a client by using a first application program          701

The server stores the related information of each idle electronic device          702

The server receives a usage request for an idle electronic device sent by a user terminal          703

The server searches for a correspondingly matched idle electronic device according to the usage request, and sends related information of the correspondingly matched idle electronic device to the user terminal, so that the user terminal remotely controls a second desktop system of the correspondingly matched idle electronic device by using a second application program          704

FIG. 7B

Operation management method
for an electronic device

Computer-readable storage medium 800

FIG. 8

METHOD, SYSTEM, MEDIUM, AND SERVER FOR OPERATION MANAGEMENT OF ELECTRONIC DEVICES

CROSS REFERENCE TO RELATED APPLICATION

This is a Sect. 371 National Stage of PCT International Application No. PCT/CN2019/101991, filed on Aug. 22, 2019, which claims the benefit of priority to Chinese Patent Application No. CN201910651072.5, entitled "METHOD AND SYSTEM FOR MANAGING OPERATION OF ELECTRONIC DEVICE, MEDIUM, AND SERVER", filed with CNIPA on Jul. 18, 2019, the disclosure of which is incorporated herein by reference in its entirety.

FIELD OF TECHNOLOGY

The present disclosure relates to the field of computer technologies, and more specifically, to a method and system for managing the operation of an electronic device, a medium, a server, and a platform.

BACKGROUND

With the development of computer and communication technologies, the hardware configuration of a computer is continually upgraded, and the functions of the software system of the computer are increasingly complete. With reference to the rapid improvement of network communication technologies, network communication between computers is more frequent and convenient. People can enjoy the convenience and efficiency brought by the rapid development of computers and networks to life anytime and anywhere. Nowadays, electronic devices such as a smart phone, a notebook computer or a desktop computer, and a PAD are a necessity for everyone, and some people even own a plurality of devices of the same type. Because time and energy of an individual are limited, the use time of electronic devices owned by an individual is also limited. As a result, these electronic devices are idle for long periods of time during the day, which is a severe waste of resources.

SUMMARY

In view of the aforementioned shortcomings, it is an objective of the present disclosure is to provide a method and system for managing the operation of an electronic device, a medium, and a server, which may resolve the problem that the existing electronic devices are idle for long periods of time during the day, resulting in resource waste.

To achieve the above objective and other related objectives, the present disclosure provides a method for managing the operation of an electronic device, comprising: receiving related information of idle electronic devices reported by a client by using a first application program, wherein the first application program is installed on the client; a system of the client is divided into a first desktop system and a second desktop system; the first desktop system is used by the client, and the second desktop system is used by a user terminal; and the first desktop system and the second desktop system are isolated from each other; storing the related information of each idle electronic device; receiving a usage request for an idle electronic device sent by a user terminal; and searching for a correspondingly matched idle electronic device according to the usage request, and sending related information of the correspondingly matched idle electronic device to the user terminal, so that the user terminal remotely controls the second desktop system of the correspondingly matched idle electronic device by using a second application program.

In an embodiment of the present disclosure, the method for managing the operation of the electronic device further comprises: displaying the related information of each idle electronic device based on a list management; and/or displaying the related information of each idle electronic device based on a map management, wherein the related information of the idle electronic devices comprises a device identification number, hardware configuration information, software configuration information, an IP address, a geographical location, a rental price, a network bandwidth or/and an available rental time period of the idle electronic devices; and monitoring operating states of the first application program and the second application program in real time.

In an embodiment of the present disclosure, an implementation process of searching for a correspondingly matched idle electronic device according to the usage request, and sending related information of the correspondingly matched idle electronic device to the user terminal comprises: searching for the correspondingly matched idle electronic device according to the usage request, wherein the usage request comprises an ID and a lease time period of the idle electronic device; acquiring an optimally matched idle electronic device from correspondingly matched idle electronic devices by using a matching strategy, and sending related information of the optimally matched idle electronic device to the user terminal; and generating, according to a confirmation instruction sent by the user terminal, an order for payment by the user terminal.

In an embodiment of the present disclosure, an implementation process of searching for a correspondingly matched idle electronic device according to the usage request, and sending related information of the correspondingly matched idle electronic device to the user terminal comprises: searching for the correspondingly matched idle electronic device according to the usage request, wherein the usage request comprises an ID and a lease time period of the idle electronic device; acquiring, according to a selection request sent by the user terminal, an idle electronic device selected by a user from correspondingly matched idle electronic devices, and sending related information of the idle electronic device selected by the user to the user terminal; and generating, according to a confirmation instruction sent by the user terminal, an order for payment by the user terminal.

In an embodiment of the present disclosure, the confirmation instruction comprises a lease time period in which an idle electronic device is leased; and the lease time period is the same as the available rental time period, or the lease time period is a continuous time period or several intermittent time periods in the available rental time period.

In an embodiment of the present disclosure, an implementation process that the user terminal remotely controls the correspondingly matched idle electronic device comprises: installing the second application program on the user terminal; installing the first application program on the idle electronic device; and communicating, using the second application program, with the first application program in a peer-to-peer manner, to enable the user terminal to remotely control the correspondingly matched idle electronic device.

In an embodiment of the present disclosure, the method for managing the operation of the electronic device further comprises: receiving the related information of the idle electronic device reported by the client by using the first application program, wherein the first application program is further installed on the user terminal; a system of the user terminal is divided into a first desktop system and a second desktop system by the first application program; the first desktop system is used by the user terminal, and the second desktop system is used by a client; and the first desktop system and the second desktop system are isolated from each other; storing the related information of each idle electronic device; receiving a usage request for an idle electronic device sent by the client; and searching for a correspondingly matched idle electronic device according to the usage request, and sending related information of the correspondingly matched idle electronic device to the client, so that the client remotely controls a second desktop system of the correspondingly matched idle electronic device by using the second application program, wherein the second application program is further installed on the client.

The present disclosure further provides a system for managing the operation of an electronic device, comprising: at least one client used as an idle electronic device, wherein a first application program is installed on a client; the client reports related information of the idle electronic device by using the first application program; a system of the client is divided into a first desktop system and a second desktop system; the first desktop system is used by the client, and the second desktop system is used by a user terminal; and the first desktop system and the second desktop system are isolated from each other; a server, communicatively connected to each client, and configured to store the related information of the idle electronic devices reported by each client; and at least one user terminal, communicatively connected to the server, and configured to send a usage request of the idle electronic devices to the server and receive related information of an idle electronic device matched with the usage request, wherein the related information is fed back by the server, and the user terminal remotely logs in to the second desktop system of a corresponding idle electronic device through a second application program to perform operations.

The present disclosure further provides a computer-readable storage medium, storing a computer program, wherein the method for managing the operation of an electronic device is implemented when the program is executed by a processor.

The present disclosure further provides a server, and the server comprises: a memory, storing a computer program; and a processor, communicatively connected to the memory, wherein when executing the computer program, the processor implements the method for managing the operation of an electronic device.

As described above, methods and systems for managing the operation of an electronic device, a medium, and a server consistent with the present disclosure have the following beneficial effects:

In the present disclosure, an electronic device in an idle state may be rented to others for use, realizing full utilization of the electronic device, avoiding a waste of idle resources, saving user costs, and reducing pollution.

BRIEF DESCRIPTION OF THE DRAWINGS

Other features, objectives, and advantages consistent with the present invention will become more obvious by reading the detailed description of non-limitative embodiments that is provided with reference to the following accompanying drawings:

4

Figure 5:
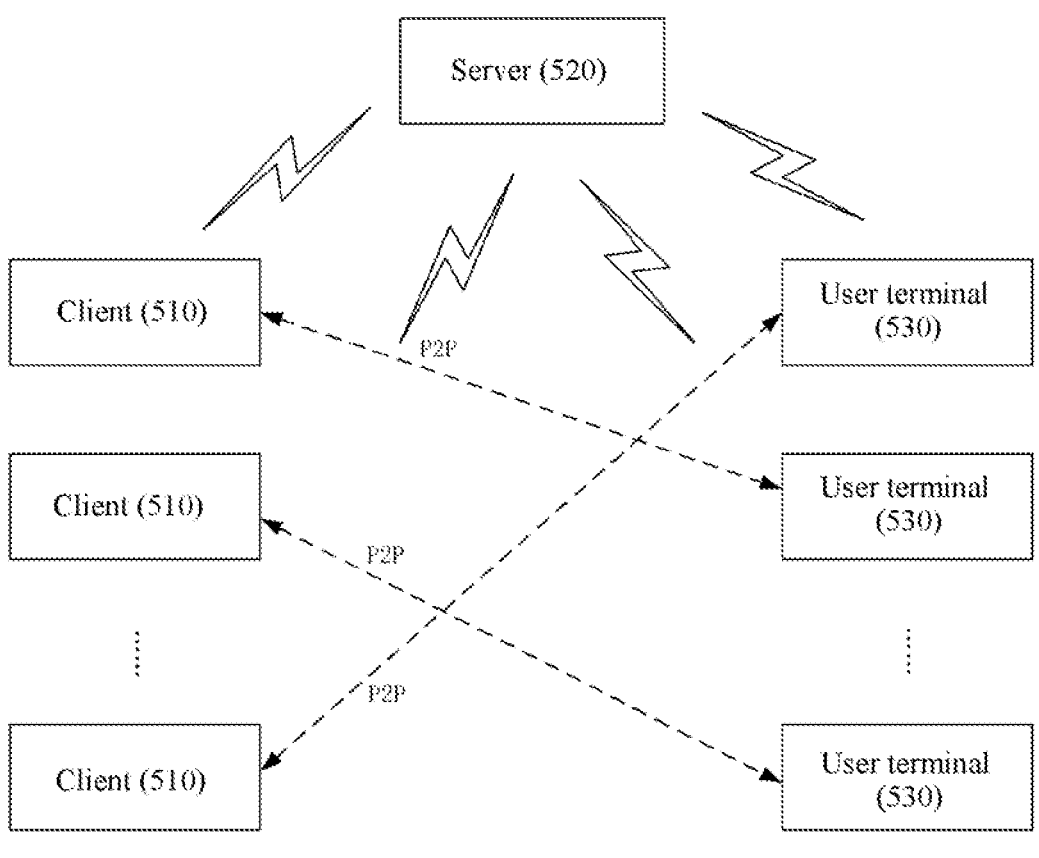
Figure 7A:
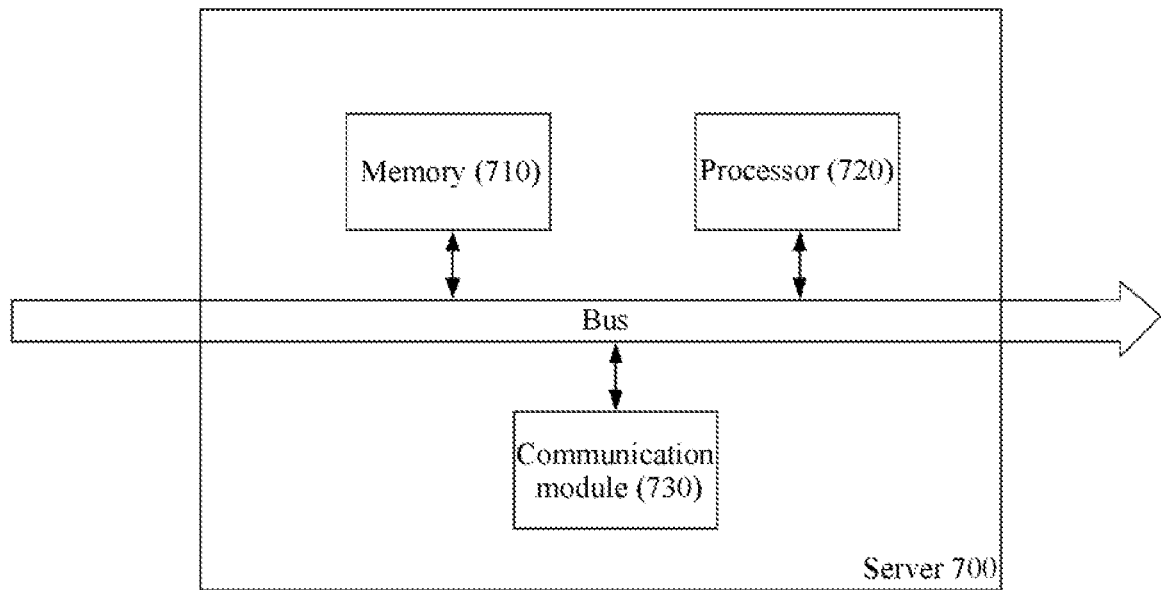

FIG. 1 is a schematic flowchart of an implementation of a method for managing the operation of an electronic device according to an embodiment of the present disclosure;

FIG. 2 is a schematic flowchart of an implementation of step S104 of a method for managing the operation of an electronic device according to an embodiment of the present disclosure;

FIG. 3 is another schematic flowchart of another implementation of step S104 of a method for managing the operation of an electronic device according to an embodiment of the present disclosure;

FIG. 4 is a schematic diagram of an implementation in which a user terminal remotely controls a correspondingly matched idle electronic device according to an embodiment of the present disclosure;

FIG. 5 is a schematic architectural diagram of an implementation of a system for managing the operation of an electronic device according to an embodiment of the present disclosure;

FIG. 6 is a schematic structural diagram of an implementation of a system for managing the operation of an electronic device according to an embodiment of the present disclosure;

FIG. 7A is a schematic structural diagram of an implementation of a server according to an embodiment of the present disclosure;

FIG. 7B is a flowchart of an execution method of a server according to an embodiment of the present disclosure;

FIG. 8 is a schematic structural diagram of an implementation of a computer-readable storage medium according to an embodiment of the present disclosure.

DETAILED DESCRIPTION

The embodiments of the present disclosure will be described below through specific examples. Those skilled in the art can easily understand other advantages and effects of the present disclosure according to contents disclosed by the specification. The present disclosure can also be implemented or applied through other different specific embodiments. Various modifications or changes can also be made to all details in the specification based on different points of view and applications without departing from the spirit of the present disclosure. It needs to be stated that the embodiments and the features in the embodiments in the present disclosure can be combined with one another under the situation of no conflict.

The embodiments of the present disclosure are described in detail below with reference to the drawings, so that those skilled in the art can easily implement the present disclosure. The present disclosure can be embodied in a variety of different forms and is not limited to the embodiments described herein.

Nowadays, with the rapid development of industrial modernization, supplies of automobiles, computers, and mobile phones have all exceeded demands. The market is almost saturated, and the update of products is fast, which undoubtedly accelerates product obsolescence. Such a business mode of seizing the market by product update also exacerbates the waste of such resources. On the one hand, the resources required for manufacturing the products such as automobiles and computers are limited on the Earth, but the rapid update of such products has caused a tremendous waste of resources. On the other hand, the waste caused by the scrapped products is also terrifying, and also severely affects the living environment of people. Therefore, the whole world is calling for energy conservation and emission reduction, environment protection, and waste reduction.

In response to the call of the world, the present disclosure provides a method for managing the operation of an electronic device. The method can enable idle electronic devices to be rented to others for use to increase the use time of the idle electronic devices, which reduces the costs of owners and users, saves resources and protects the environment.

Referring to FIG. 1A, an embodiment of the present disclosure provides a method for managing the operation of an electronic device, comprising the following steps:

S101*a*, Receiving related information of idle electronic devices reported by a client by using a first application program. The related information of the idle electronic devices comprises a device identification number, hardware configuration information, software configuration information, an IP address, a geographical location, a rental price, a network bandwidth or/and an available rental time period of the idle electronic devices. The first application program is installed on the client; a system of the client is divided into a first desktop system and a second desktop system; the first desktop system is used by the client, and the second desktop system is used by a user terminal; and the first desktop system and the second desktop system are isolated from each other and do not communicate with each other. After being used, the second desktop system may be restarted to clear use information generated last time.

S102*a*, Storing the related information of each idle electronic device.

S103*a*, Receiving a usage request for an idle electronic device sent by a user terminal. The usage request comprises an ID and a lease time period of the idle electronic device.

S104*a*, Searching for a correspondingly matched idle electronic device according to the usage request, and sending related information of the correspondingly matched idle electronic device to the user terminal, so that the user terminal remotely controls the second desktop system of the correspondingly matched idle electronic device by using a second application program.

During specific implementation, the idle electronic devices may be set to several levels, and a user only needs to select a corresponding level and submits a corresponding usage time period, which can simplify a selection process.

In the present disclosure, the client may not only report the client as an idle electronic device by installing the first application program, but also rent another idle electronic device by installing the second application program. Similarly, the user terminal may not only rent another idle electronic device by installing the second application program, but also report the user terminal as an idle electronic device by installing the first application program. Either the client or the user terminal, the first application program is configured to report the related information of the idle electronic device, and the second application program is configured to rent another idle electronic device.

Therefore, referring to FIG. 1B, the method for managing the operation of the electronic device consistent with this embodiment of the present disclosure may further comprise the following steps:

S101*b*, Receiving the related information of the idle electronic devices reported by the client by using the first application program. The first application program is further installed on the user terminal; a system of the user terminal is divided into a first desktop system and a second desktop system by the first application program; the first desktop system is used by the user terminal, and the second desktop system is used by a client; the first desktop system and the second desktop system are isolated from each other.

S102*b*, Storing the related information of each idle electronic device.

S103*b*, Receiving a usage request for an idle electronic device sent by the client.

S104*b*, Searching for a correspondingly matched idle electronic device according to the usage request, and sending related information of the correspondingly matched idle electronic device to the client, so that the client remotely controls a second desktop system of the correspondingly matched idle electronic device by using a second application program, wherein the second application program is further installed on the client.

In an embodiment of the present disclosure, the operation management method for an electronic device further comprises the following steps:

S10A, Displaying the related information of each idle electronic device based on a list management; and/or displaying the related information of each idle electronic device based on a map management. Step S10A may be performed after step S102*a* (or step S102*b*) and before step S103*a* (or step S103*b*), or may be performed after step S103*a* (or step S103*b*) and before step S104*a* (or step S104*b*), or may be performed during the implementation of the step S104*a*.

S10B, Monitoring operating states of the first application program and the second application program in real time. Step S10B may be performed before or after any step from step S101*a* (or step S101*b*) to step S104*a* (or step S104*b*), or may be performed synchronously with any step from step S101*a* (or step S101*b*) to step S104*a* (or step S104*b*).

Referring to FIG. 2, in an embodiment of the present disclosure, an implementation process of searching for a correspondingly matched idle electronic device according to the usage request, and sending related information of the correspondingly matched idle electronic device to the user terminal (or the client) in step S104*a* (or S104*b*) comprises:

S201, Searching for the correspondingly matched idle electronic device according to the usage request, wherein the usage request comprises an ID and a lease time period of the idle electronic devices.

S202, Acquiring an optimally matched idle electronic device from correspondingly matched idle electronic devices by using a matching strategy, and sending related information of the optimally matched idle electronic device to the user terminal (or the client).

S203, Generating, according to a confirmation instruction sent by the user terminal (or the client), an order for payment by the user terminal. Further, the confirmation instruction comprises a lease time period in which an idle electronic device is leased; and the lease time period is the same as the available rental time period, or the lease time period is a continuous time period or several intermittent time periods in the available rental time period.

Referring to FIG. 3, in an embodiment of the present disclosure, an implementation process of searching for a correspondingly matched idle electronic device according to the usage request, and sending related information of the correspondingly matched idle electronic device to the user terminal (or the client) in step S104*a* (or S104*b*) comprises:

S301, Searching for the correspondingly matched idle electronic device according to the usage request, wherein the usage request comprises an ID and a lease time period of the idle electronic devices.

S302, Acquiring, according to a selection request sent by the user terminal (or the client), an idle electronic device selected by a user from correspondingly matched idle electronic devices, and sending related information of the idle electronic device selected by the user to the user terminal (or the client).

S303, Generating, according to a confirmation instruction sent by the user terminal (or the client), an order for payment by the user terminal. Further, the confirmation instruction comprises a lease time period in which an idle electronic device is leased; and the lease time period is the same as the available rental time period, or the lease time period is a continuous time period or several intermittent time periods in the available rental time period.

Referring to FIG. 4, in an embodiment of the present disclosure, an implementation process that the user terminal (or the client) remotely controls the correspondingly matched idle electronic device in step S104*a* (or S104*b*) comprises that: a second application program 420 is installed on the user terminal (or the client); a first application program 410 is installed on the idle electronic device; and the second application program 420 is communicatively connected to the first application program 410 in a peer-to-peer (P2P) manner, so that the user terminal (or the client) remotely controls the correspondingly matched idle electronic device. A P2P technology is a new network technology that relies on computing power and bandwidth of participants in a network, rather than wholly depending on a few servers. A P2P network is often used to connect nodes through Ad Hoc connections.

The protection scope of methods for managing the operation of an electronic device consistent with the present disclosure is not limited to the execution sequence of the steps listed in this embodiment, and all solutions implemented by adding or replacing a step in the prior art according to the principle of the present disclosure fall within the protection scope of the present disclosure.

The present disclosure further provides a system for managing the operation of an electronic device. The system for managing the operation of an electronic device can implement the above methods for managing the operation of an electronic device consistent with the present disclosure, but an apparatus for implementing the method for managing the operation of an electronic device consistent with the present disclosure comprises, but is not limited to structures of the system for managing the operation of an electronic device listed in this embodiment. Any structural deformation and replacement of the prior art made according to the principle of the present disclosure fall within the protection scope of the present disclosure.

Referring to FIG. 5, an embodiment of the present disclosure further provides a system 500 for managing the operation of an electronic device. The system 500 for managing the operation of an electronic device comprises: at least one client 510, a server 520, and at least one user terminal 530. The client 510 is used as an idle electronic device. A first application program is installed on the client; the client reports related information of idle electronic devices by using the first application program; a system of the client is divided into a first desktop system and a second desktop system; the first desktop system is used by the client, and the second desktop system is used by a user terminal; and the first desktop system and the second desktop system are isolated from each other. The server 520 is communicatively connected to each client 510 and configured to store the related information of the idle electronic devices reported by each client. The user terminal 530 is communicatively connected to the server 520 and configured to send a usage request for the idle electronic devices to the server, and receives related information of an idle electronic device matched with the usage request. The related information is fed back by the server 520. The user terminal remotely logs in to the second desktop system of a corresponding idle electronic device through a second application program to perform operations. The related information of the idle electronic device comprises a device identification number, hardware configuration information, software configuration information, an IP address, a geographical location, a rental price, a network bandwidth or/and an available rental time period of the idle electronic device. The usage request comprises an ID or/and a lease time period of the idle electronic device.

Figure 6A:
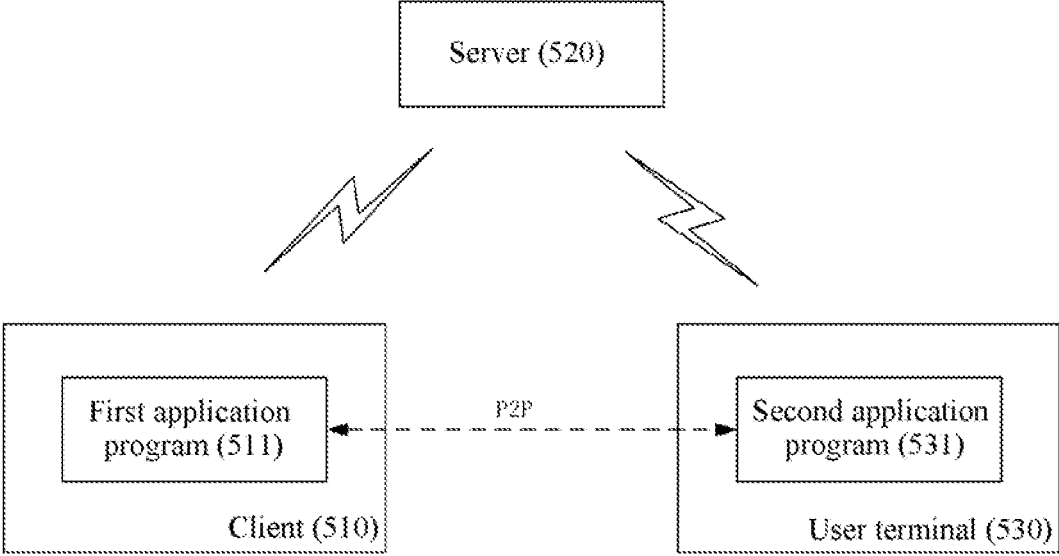

Referring to FIG. 6A, in an embodiment of the present disclosure, a first application program 511 is installed on the client 510, and the first application program 511 is configured to report related information of an idle electronic device. The client reports the related information of the idle electronic device by using the first application program. A system of the client is divided into a first desktop system and a second desktop system; the first desktop system is used by the client, and the second desktop system is used by a user terminal; and the first desktop system and the second desktop system are isolated from each other. The second application program 531 is installed on the user terminal 530, and the second application program is configured to rent an idle electronic device. The user terminal 530 is remotely connected to the first application program of the correspondingly matched idle electronic device through the second application program 531, to remotely control the second desktop system of the correspondingly matched idle electronic device. The first application program is configured to enable the client to report the related information of the idle electronic device to the server 520. The second application program is configured to enable the user terminal to send the usage request for the idle electronic device to the server 520, receives the related information (which is fed back by the sever 520) of the idle electronic device matched with the usage request, and establishes a remote communication connection to the first application program in the idle electronic device obtained through the feedback, so that the user terminal remotely controls the corresponding idle electronic device. The server 520 may monitor operating states of the first application program 511 and the second application program 531 in real time. The second application program 531 may be communicatively connected to the first application program 511 in a peer-to-peer manner, so that the user terminal remotely controls the correspondingly matched idle electronic device. A P2P technology is a new network technology that relies on computing power and bandwidth of participants in a network, rather than wholly depending on a few servers. A P2P network is often used to connect nodes through Ad Hoc connections.

Figure 6B:
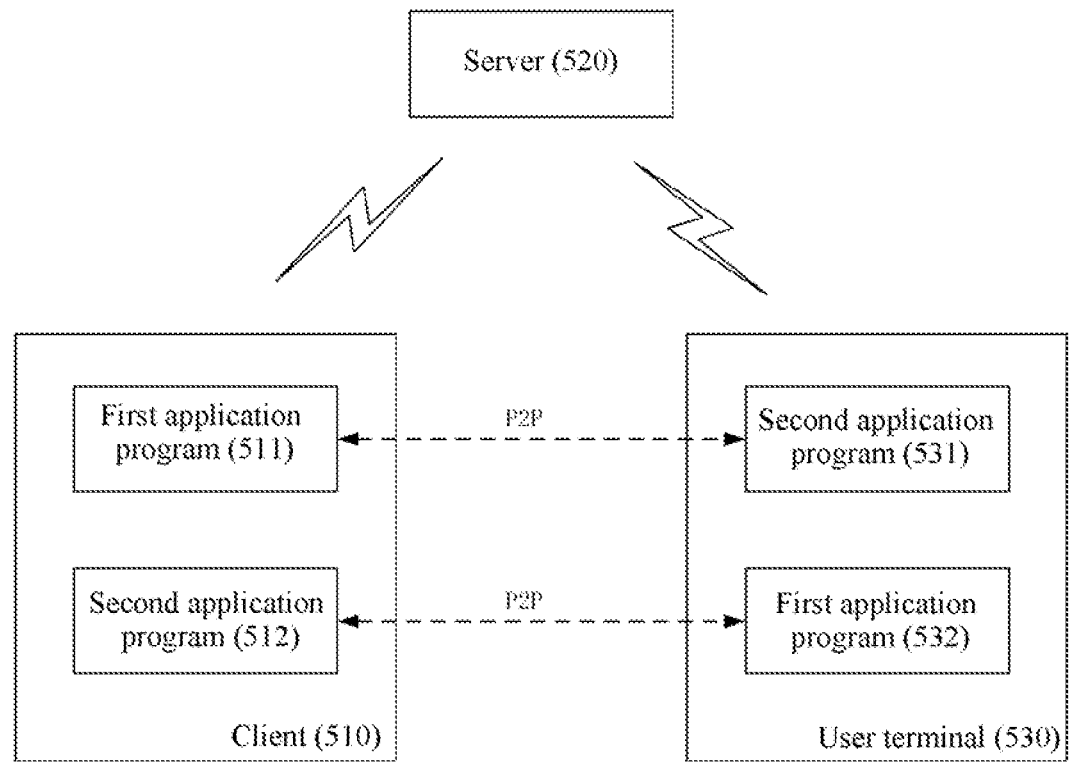

Referring to FIG. 6B, in an embodiment of the present disclosure, the client 510 may not only report the client as an idle electronic device by installing the first application program 511, but also rent another idle electronic device by installing the second application program 512. Similarly, the user terminal 530 may not only rent another idle electronic device by installing the second application program 531, but also report the user terminal as an idle electronic device by installing the first application program 532. Either the client or the user terminal, the first application program is configured to report the related information of the idle electronic device, and the second application program is configured to rent another idle electronic device.

Referring to FIG. 7A, an embodiment of the present disclosure further provides a server 700. The server 700 comprises a memory 710, a processor 720, and a communication module 730. The memory 710 stores a computer program. The processor 720 is communicatively connected to the memory 710, wherein when executing the computer program, the processor implements the method for managing the operation of an electronic device consistent with the present disclosure. Referring to FIG. 7B, the method comprises the following steps.

S701, The server 700 receives related information of idle electronic devices reported by a client (or a user terminal) by using a first application program. The related information of the idle electronic devices comprises a device identification number, hardware configuration information, software configuration information, an IP address, a geographical location, a rental price, a network bandwidth or/and an available rental time period of the idle electronic device. The first application program is installed on the client (or the user terminal); a system of the client (or the user terminal) is divided into a first desktop system and a second desktop system by the first application program; the first desktop system is used by the client (or the user terminal), and the second desktop system is used by a user terminal (or the client); and the first desktop system and the second desktop system are isolated from each other.

S702, The server 700 stores the related information of each idle electronic device. Step S702 may further comprise displaying the related information of each idle electronic device to the user terminal or not displaying the related information of each idle electronic device to the user terminal. A display manner may be a list-based management manner or a map-based management manner.

S703, The server 700 receives a usage request for an idle electronic device sent by the user terminal (or the client). The usage request comprises an ID and a lease time period of the idle electronic device. Step S703 may further comprise displaying the related information of each idle electronic device to the user terminal or not displaying the related information of each idle electronic device to the user terminal according to the usage request. The display manner may be a list-based management manner or a map-based management manner.

S704, The server 700 searches for a correspondingly matched idle electronic device according to the usage request, and sends related information of the correspondingly matched idle electronic device to the user terminal (or the client), to enable the user terminal (or the client) to remotely control the correspondingly matched idle electronic device. Step S704 may further comprise displaying the related information of each idle electronic device to the user terminal (or the client) or not displaying the related information of each idle electronic device to the user terminal (or the client) during a search process. The display manner may be a list-based management manner or a map-based management manner.

Referring to FIG. 8, an embodiment of the present disclosure further provides a computer-readable storage medium 800, storing a computer program, wherein the method for managing the operation of an electronic device consistent with the present disclosure is implemented when the program is executed by a processor.

In the present disclosure, an electronic device in an idle state may be rented to others for use, realizing full utilization of the electronic device, avoiding a waste of idle resources, saving user costs, and reducing pollution.

In summary, the present disclosure effectively overcomes various defects in the prior art and has high industrial value in use.

The above-mentioned embodiments are merely illustrative of the principle and effects of the present disclosure instead of limiting the present disclosure. Modifications or variations of the above-described embodiments may be made by those skilled in the art without departing from the spirit and scope of the present disclosure. Therefore, all equivalent modifications or changes made by those who have common knowledge in the art without departing from the spirit and technical concept disclosed by the present disclosure shall be still covered by the claims of the present disclosure.

What is claimed is:

1. A method for providing isolated remote access to an electronic device, comprising:

executing a first application program on a client device to configure a client device system into a first desktop system and a second desktop system, wherein the first desktop system and the second desktop system are isolated from each other and do not communicate with each other; wherein the first desktop system is configured for use by the client device, and the second desktop system is configured for use by a user terminal; and wherein the first application program is installed on the client device; and the first application program is configured to report related information of idle electronic devices to the server;

reporting, by the first application program on the client device, related information of idle electronic devices to a server, wherein the related information of the idle electronic devices comprises a device identification number, hardware configuration information, software configuration information, an IP address, a geographical location, a network bandwidth or/and an available first time period of the idle electronic devices; wherein the client device reports itself as an idle electronic device by the first application program;

receiving, by the server, a usage request for an idle electronic device sent by a user terminal; wherein the usage request is a remote access request, comprising an ID and a second time period of the idle electronic devices; and wherein a second application program is installed on the user terminal and the second application program is configured to send usage request for idle electronic devices to the server;

the server searching for a correspondingly matched idle electronic device according to the usage request, and sending related information of the correspondingly matched idle electronic device to the user terminal;

executing the second application program on the user terminal to establish a remote control session with the first application program of the correspondingly matched idle electronic device in a peer-to-peer communication manner, wherein the correspondingly matched idle electronic device is the client device, so that the user terminal remotely controls the second desktop system of the client device; wherein, after termination of the remote control session, the second desktop system is restarted to clear usage information generated last time; and monitoring, by the server, operating states of the first application program and the second application program in real time.

2. The method of claim 1, further comprising:

the server displaying the related information of each idle electronic device based on a list management; and/or displaying the related information of each idle electronic device based on a map management.

3. The method of claim 1, wherein an implementation process of searching for a correspondingly matched idle electronic device according to the usage request, and sending related information of the correspondingly matched idle electronic device to the user terminal comprises:

searching for the correspondingly matched idle electronic device according to the usage request, wherein the usage request comprises an ID and a second time period of the idle electronic devices; and acquiring an optimally matched idle electronic device from correspondingly matched idle electronic devices by using a matching strategy, and sending related information of the optimally matched idle electronic device to the user terminal.

4. The method of claim 1, wherein an implementation process of searching for a correspondingly matched idle electronic device according to the usage request, and sending related information of the correspondingly matched idle electronic device to the user terminal comprises:

searching for the correspondingly matched idle electronic device according to the usage request, wherein the usage request comprises an ID and a second time period of the idle electronic devices; and acquiring, according to a selection request sent by the user terminal, an idle electronic device selected by a user from correspondingly matched idle electronic devices, and sending related information of the idle electronic device selected by the user to the user terminal.

5. The method of claim 3, wherein the confirmation instruction comprises a second time period in which an idle electronic device is accessed; and the second time period is the same as the available first time period, or the second time period is a continuous time period or several intermittent time periods in the available first time period.

6. The method of claim 1, further comprising:

executing the first application program on the user terminal to configure a user terminal system into a third desktop system and a fourth desktop system, wherein the first application program is further installed on the user terminal; wherein the third desktop system and the fourth desktop system are isolated from each other and do not communicate with each other; wherein the third desktop system is configured for use by the user terminal, and the fourth desktop system is configured for use by the client device;

reporting, by the first application program on the user terminal, related information of idle electronic devices to the server, wherein the user terminal reports itself as an idle electronic device by the first application program;

the server storing the related information of each idle electronic device;

receiving, by the server, a usage request for an idle electronic device sent by the client device; wherein the second application program is further installed on the client device;

the server searching for a correspondingly matched idle electronic device according to the usage request, and sending related information of the correspondingly matched idle electronic device to the client device; and executing the second application program on the client device to establish a remote control session with the first application program of the correspondingly matched idle electronic device in a peer-to-peer communication manner, wherein the correspondingly matched idle electronic device is the user terminal, so that the client device remotely controls the fourth desktop system of the user terminal.

7. A non-transitory computer-readable storage medium, storing a computer program, wherein the program, when executed by a processor, implements the method for providing isolated remote access to an electronic device as in claim 1.

8. A server, comprising:

a memory, storing a computer program; and a processor, communicatively connected to the memory, wherein when executing the computer program, the processor implements the method for providing isolated remote access to an electronic device as in claim 1.

9. The method for managing the operation of the electronic device as of claim 4, wherein the confirmation instruction comprises a second time period in which an idle electronic device is accessed; and the second time period is the same as the available first time period, or the second time period is a continuous time period or several intermittent time periods in the available first time period.

10. The method according to claim 1, wherein at least one client device is provided, each client device being configurable to:

report itself as an idle electronic device by installing the first application program; or send a usage request for an idle electronic device by installing the second application program;

and wherein at least one user terminal is provided, each user terminal being configurable to:

send a usage request for an idle electronic device by installing the second application program; or report itself as an idle electronic device by installing the first application program.

* * * * *